No. 623,015. Patented Apr. 11, 1899.
I. HENDERSON.
VEHICLE WHEEL.
(Application filed July 22, 1898.)
(No Model.)
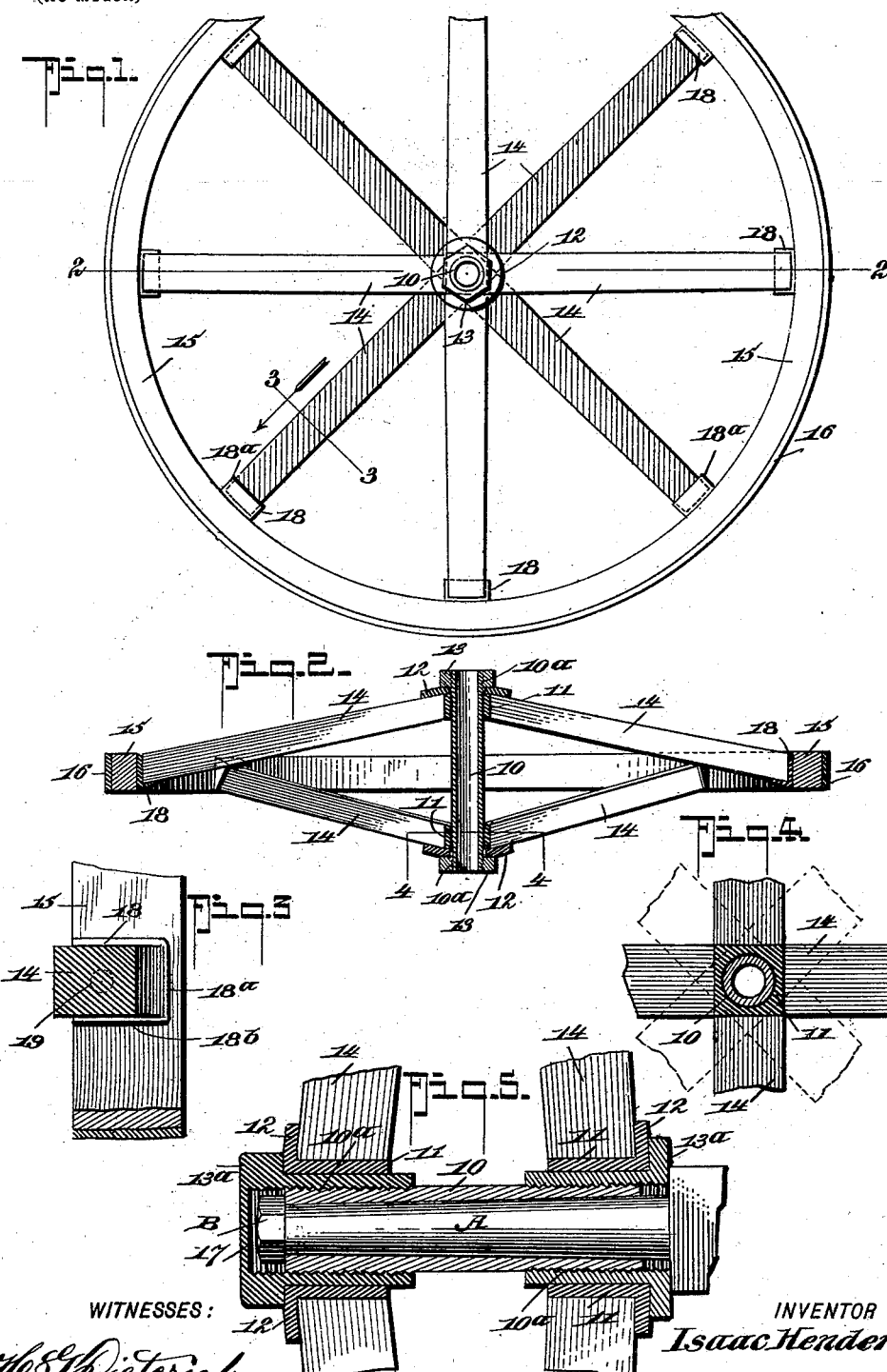
WITNESSES:
H. S. Dieterich
E. McCormic
INVENTOR
Isaac Henderson
BY
Fred G. Dieterich
ATTORNEY.

UNITED STATES PATENT OFFICE.

ISAAC HENDERSON, OF VANCOUVER, CANADA.

VEHICLE-WHEEL.

SPECIFICATION forming part of Letters Patent No. 623,015, dated April 11, 1899.

Application filed July 22, 1898. Serial No. 686,645. (No model.)

*To all whom it may concern:*

Be it known that I, ISAAC HENDERSON, a citizen of the Dominion of Canada, residing at Vancouver, in the Province of British Columbia, Canada, have invented certain new and useful Improvements in Vehicle-Wheels, of which the following is a specification.

This invention relates to improvements in that class of wheels having the spokes divergingly arranged from the felly to the axle and having adjustable devices movable longitudinally upon the axle, whereby the spokes may be drawn together and moved into a tightened condition relatively to the axle and the felly, and such improvements more particularly refer to a wheel especially adapted to wheelbarrows and carriages of a cheap and light construction.

Primarily this invention has for its object to provide a wheel of this character of a very simple and inexpensive construction and having the adjusting means so arranged that the spokes may be conveniently and quickly tightened without detaching any of the component parts forming the wheel.

This invention also comprehends a simple construction of parts, including means for providing firm and rigid bearings for the spokes at their point of connection with the hub and the felly, whereby a very slight adjustment on the tightening parts will effect a very tight binding or clamping action.

Although my improved construction of parts is especially adapted to wheels of the character above mentioned, it is my opinion that the same can be advantageously and economically used for carriages or wagons of a more expensive pattern than that stated.

The invention consists in the peculiar combination and novel arrangement of parts, such as will be first described in detail and then be specifically pointed out in the appended claims, reference being had to the accompanying drawings, in which—

Figure 1 is a face view of a portion of a wheel constructed in accordance with my invention. Fig. 2 is a transverse section of the same, taken on the line 2 2 of Fig. 1. Fig. 3 is a detail cross-section taken on the line 3 3 of Fig. 1 and illustrating the manner of connecting the spokes to the felly. Fig. 4 is a detail cross-section taken practically on the line 4 4 of Fig. 2; and Fig. 5 illustrates a modified form of my improvements, illustrating how the same may be applied to a high grade of wheel.

Referring to the accompanying drawings, in which like numerals and letters indicate like parts in all the figures, 10 indicates the tubular hub having threads $10^a$ at each end thereof. Upon this hub at each end is loosely fitted a sleeve 11, which sleeves are slipped over the hub and have regular flattened sides to receive the flat inner ends of the spokes 14.

In the drawings I have shown the sleeves as having four flattened sides, as the wheel consists of eight spokes, four engaging the hub at each end. It is obvious that the spokes may be increased according to the size of the wheel, the sleeves in all cases having flattened sides in number corresponding to the number of the spokes in the wheel.

To provide for a cheap and convenient means for connecting the spokes to the felly and to avoid the necessity of making sockets in the fellies, sheet-metal clamps or shoes 18 are provided. These shoes each consist of a socket having a rear or abutting wall $18^a$ and side flanges $18^b$, and in practice the several sockets are alternately arranged upon the felly—that is, the abutment-walls $18^a$ of the alternate sockets face in alternate directions, the purpose of which will presently appear—said sockets being secured to the felly by nails or screws, as indicated by 19 in dotted lines, Fig. 3.

By reference to Fig. 2 it will be observed that the inner ends of the spokes are cut on an obtuse angle, whereby to form a flat bearing-face to engage the square faces of the sleeve 11, while their outer ends are cut at an acute angle, but having a similar or flat bearing-face against the base of the sockets or shoes 18.

Lying in close proximity to the outer sides of the sleeves 11 are washers 12, which preferably have their edges turned inwardly to lie flat against the outer faces of the spokes, said washers when thus arranged forming a more secure lock-bearing for holding the inner ends of the spokes in tight engagement with the sleeves 11.

While I prefer to make the washers with inwardly-extending edges, it is obvious that such edges may be dispensed with and the ends of the spokes widened or suitably formed to also engage the sides of straight washers.

Upon the threaded end of the hub or axle are nuts 13, which when tightened serve to force the washers 12 and sleeves 11 inward, and consequently draw the inner ends of the spokes together, and thereby force the felly outward and make a tight connection of the tire, felly, spokes, and hub, binding them, as it were, in such a manner as to make practically an integral connection of the several parts.

In the application of my improvement to the higher grade of vehicles I prefer to arrange the several parts in the manner illustrated in Fig. 5, by reference to which it will be observed that the hub 10 is preferably made with a tapering aperture to receive the ordinary axle-spindle A, and the hub is held in place by a nut B, which jams against the shoulder on the axle and overlaps the end of the hub, and thus keeps it from coming off. The spokes 14 are tightened in the same manner as before mentioned; but the sleeves 11 in this case and the washers 12 are preferably made integral, and the nuts $13^a$ have extended threaded sleeves which pass through the sleeves 11 and engage the extreme threads on the hub 10, the outer portion of the ends $13^a$ being in the nature of closed caps, as indicated at 17, to prevent dust getting in the journal of the axle and also to hold the lubricant from escaping. It will thus be seen that the hub is held in position by the shouldered nut $13^a$, lying against the enlarged portion or neck of the axle, and by the nut B, which is jammed on the extreme end of the axle and held to bear against the outer end of the hub.

From the foregoing description, taken in connection with the accompanying drawings, it is thought the advantages of my improvement will readily appear. It will be observed that as the sockets or shoes 18 are alternately disposed upon the inner face of the felly their abutment edges form solid bearings which serve to keep the outer ends of the spokes positively in a tight contact with the felly, it being also clear that, owing to the angularity of the inner and outer ends of the spokes, any adjustment effecting an inward pressure on the inner ends of the spokes will only tend to cause the said angle ends of the spokes to bind more positively against the shoes at the outer end and the slidable sleeves or bearing members at the inner end.

This construction and arrangement of parts is of an extremely simple nature, and in the event of repairs being required a new spoke or any other part may be quickly inserted with but little trouble or delay.

Having thus described my invention, what I claim, and desire to secure by Letters Patent, is—

1. In a wheel of the character described; in combination with the axle-spindle and the tubular hub fitted thereon, said hub having external threads on its opposite ends; of the shouldered nuts $13^a$, engaging the hub; the sleeves 11 having flattened bearing-surfaces; the spokes, and the fellies having spoke-receiving sockets, all being arranged substantially as shown and for the purposes described.

2. A vehicle-wheel having a hollow hub provided with external threads on its outer ends; sleeves 11 loosely fitted thereon, in combination with the wheel-rim and the spokes 14, interposed between the sleeves and the rim, said spokes being internally deflected oppositely from the plane of the wheel-rim; the washers 12, lying against the outer sides of the spokes and the sleeves; the nuts 13 engaging the threaded ends of the hub, all being arranged substantially as shown, whereby the ends of the spokes engaging the sleeves 11, and such sleeves, may be drawn together, substantially as shown and for the purposes described.

3. A wheel of the class described, having a tubular hub and the sleeves 12 slidable upon the hub; in combination with the felly and the tire; shoes 18 secured to the felly to receive the ends of the spokes, said shoes having each a clamp or abutment-wall, and means for drawing the concentrically-disposed ends of the said spokes together, as set forth.

ISAAC HENDERSON.

Witnesses:
 W. G. INTHERNEY,
 FRED G. DIETERICH.